United States Patent [19]

Gassino et al.

[11] 3,924,105

[45] Dec. 2, 1975

[54] DEVICE FOR OPTICALLY READING CODED IDENTITY CARDS AND THE LIKE

[75] Inventors: Teresio Gassino, Ivrea; Gianni Colombo, Sesto Calende, both of Italy

[73] Assignee: Tesalon Anstalt, Vaduz, Liechtenstein

[22] Filed: May 17, 1974

[21] Appl. No.: 471,078

[30] Foreign Application Priority Data

May 18, 1973 Switzerland .................... 7099/73

[52] U.S. Cl. ...... 235/61.11 E; 235/61.7 B; 250/566; 340/146.3 F

[51] Int. Cl.² .................... G06K 7/10; G06K 9/13

[58] Field of Search ........... 250/566, 568, 569, 570; 235/61.11 E, 61.12 N, 61.7 B; 340/173 LT, 173 LS, 173 LM; 179/80; 178/7.6

[56] References Cited

UNITED STATES PATENTS

| | | | |
|---|---|---|---|
| 3,061,730 | 10/1962 | Jankowitz | 250/566 |
| 3,216,317 | 11/1965 | Nail | 235/61.11 E |
| 3,592,972 | 7/1971 | Lane | 179/80 |
| 3,663,800 | 5/1972 | Myer | 235/61.11 E |
| 3,728,677 | 4/1973 | Munson | 340/146.3 F |
| 3,818,444 | 6/1974 | Connell | 340/146.3 F |

OTHER PUBLICATIONS

R. E. Tibbetts, "Simplified Optical Unit for a Page Scanner," IBM Tech. Disclosure Bull., Vol. 8, No. 6, p. 885, Nov. 1965.

*Primary Examiner*—Daryl W. Cook
*Assistant Examiner*—Robert M. Kilgore
*Attorney, Agent, or Firm*—Guido Modiano; Albert Josif

[57] ABSTRACT

Device for optically reading coded identity cards and the like comprising a slot into which a coded card can be inserted sideways. The device also comprises a light source for illuminating the coded zone of the card through a window defined in the slot. An element for detecting thc presence of the card is provided consisting of a photodiode located on one side of the slot and a pair of facing holes provided in the slot and permitting the light rays from the light source to pass to the photodiode. The device further comprises a pyramidal mirror rotating about a vertical axis and arranged to read the coded zone over a plurality of lines during one revolution and to feed the images to a collecting photodiode. The collecting photodiode emits a signal which represents the images in a serialised configuration to a unit which visualises this signal.

3 Claims, 9 Drawing Figures

DEVICE FOR OPTICALLY READING CODED IDENTITY CARDS AND THE LIKE

BACKGROUND OF THE INVENTION

This invention relates to a device for optically reading coded identity cards and the like.

Mechanical, optical or magnetic means are usually used at present for automatically reading identification documents, coded identification cards and the like, for local processing and transmission to the computer, these means being associated with readers into which the documents are introduced or otherwise accurately positioned for reading.

It is easily understandable that the need to exactly position the identity card or document creates a considerable obstacle, especially when readings have to be made in rapid succession. In addition, the methods at present used require a certain expertise by the operator.

A further disadvantage is the fact that when the identity card or document is positioned in a not perfectly correct manner, the machine either does not make the reading or makes a wrong reading. There is thus a further loss of time which is even more felt because the complete operational potential of the machine cannot be utilised.

SUMMARY OF THE INVENTION

One object of the present invention is to provide a device for optically reading coded identity cards and the like, in which it is not necessary to exactly position the card, but instead a rough positioning is sufficient without this minimally influencing the accuracy of operation, so as to enable readings to be made in rapid succession.

A further object is to provide a device with which reading errors are practically impossible, even where the surface of the identity card is partially damaged.

These objects are attained by a device for optically reading coded identity cards and the like, comprising a slot into which an identity card can be inserted sideways, an element for detecting the presence of said identity card in said slot, a window in said slot arranged to surround at least the coded zone of said identity card, a light source for illuminating said coded zone, a rotating pyramidal mirror arranged to read said zone over a plurality of paths, a photodiode for collecting the images fed to it by said rotating mirror and to emit a signal which represents said images in a serialised configuration, and a unit for visualising said signal.

BRIEF DESCRIPTION OF THE DRAWING

The details of the device according to the invention will be more evident from the description of a preferred embodiment illustrated in the accompanying drawing in which.

DESCRIPTION OF THE PREFERRED EMBODIMENT

Figures 1, 2, 3, 7, 8:
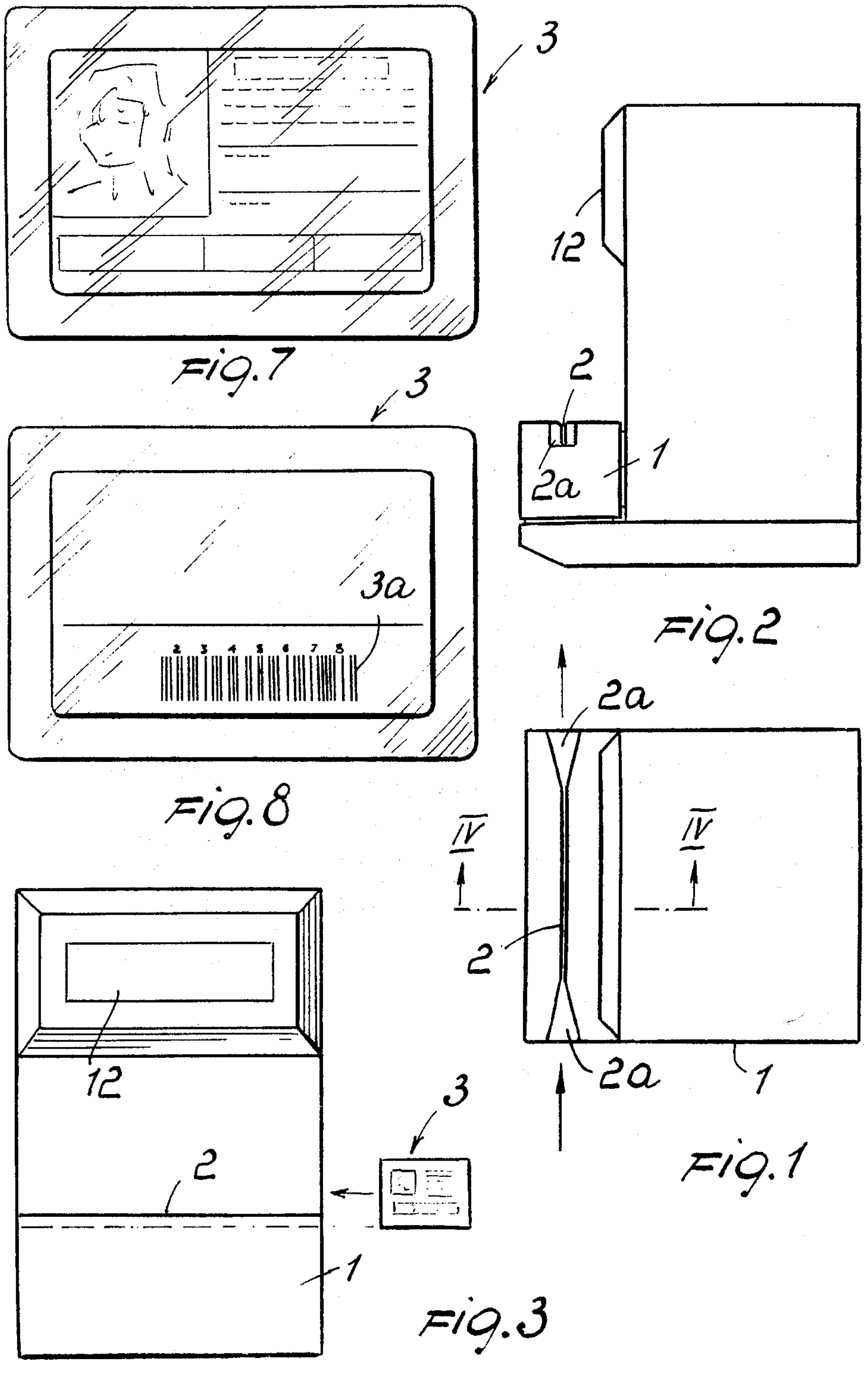
FIG. 1 is a plan view of the device.
FIG. 2 is a side view.
FIG. 3 is a frontal view.
FIGS. 7 and 8 show the two faces of a coded identity card respectively.
Figures 4, 5, 6, 9:
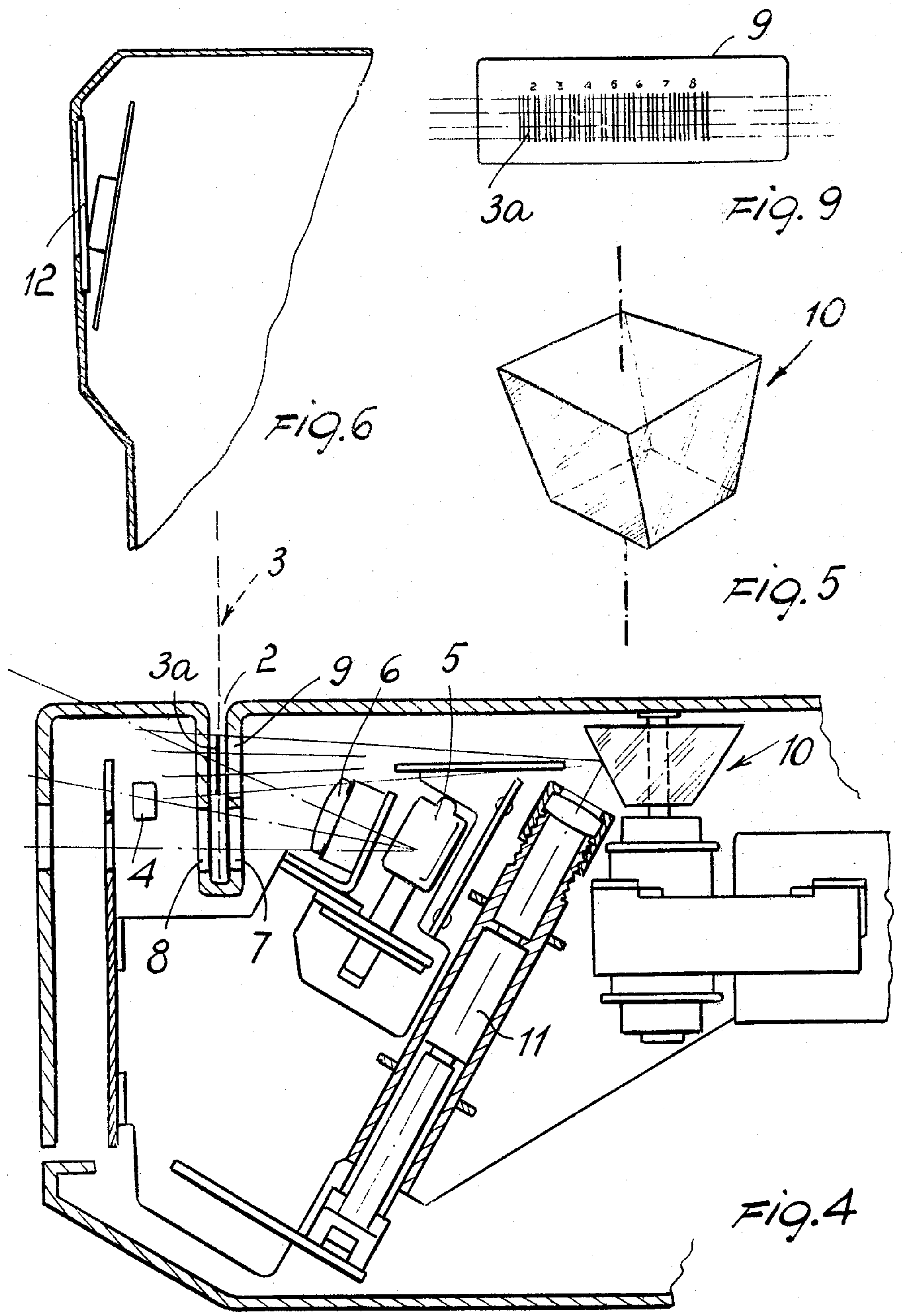
FIG. 4 is a section on the line IV—IV of FIG. 1 to enlarged scale.
FIG. 5 is a perspective detailed view of the rotating mirror.
FIG. 6 is a detailed section through the visualising unit.
FIG. 9 is a detailed view of the coded zone of an identity card.

With reference to the said figures, the device according to the invention comprises a support frame 1 containing a slot 2 which extends longitudinally and is open upwards. Said slot 2 comprises enlarged zones 2$a$ at its ends for facilitating the introduction of a coded identity card 3 into said slot 2.

The device comprises an element for detecting the presence of said identity card 3 in said slot 2, consisting of a photodiode 4 situated on one side of said slot and struck by the light rays emitted by a light source consisting of a lamp 5 and conveyed by a condenser 6.

Light is permitted to pass through the slot 2 by a pair of facing holes 7 and 8 in its middle portion, positioned so that part of the light rays emitted by the lamp 5 and conveyed by the condenser 6 can strike the photodiode 4 which detects the presence of the identity card.

A window 9, larger in each direction than the coded zone 3$a$ of the identity card 3, is provided in said slot 2 above said hole 7 on the side on which the lamp 5 is positioned.

A rotating mirror 10 is provided inside said support frame 1, facing said slot 9.

The mirror 10 rotates about a vertical axis, i.e. an axis parallel to the extension in height of said slot 2.

The rotating mirror 10, which is of inverted pyramidal shape, has its lateral faces each inclined differently to the axis of rotation of the mirror.

The device also comprises a photodiode 11 arranged to collect the images fed to it by said rotating mirror 10 and to emit a signal which represents said images in a serialised configuration.

The differential inclinations of the mirror faces mean that each mirror face transmits to said photodiode 11 readings carried out on said coded zone 3$a$ of the identity card 3 on different paths or levels. The mirror 10 in fact transmits to the photodiode 11 the points of an ideal straight line which longitudinally crosses the coded zone 3$a$. Thus because of the different inclinations, this straight line is at different heights for each face of the mirror 10.

Furthermore the mirror 10, besides permitting a plurality of readings of the same coded zone until a reading considered valid is obtained, may be arranged so as to be able to read coded zones disposed on a number of lines.

The device also comprises a visualising unit 12 able to process and traslate the signal emitted by the photodiode 11 into legible characters.

The operation of the described device is as follows.

To obtain reading of the coded zone 3$a$ of the identity card 3, the card 3 is slid into the slot 2 without it being necessary to precisely position the identity card, in that the described device is able to make a correct reading even on an approximate positioning.

To attain this object, i.e. that of not having to exactly position the identity card, it has been considered preferably to utilise a code consisting of bars of predetermined height for the coded zone. To this end, the identity card 3 comprises on one face the photograph and normal clearly legible information, while on the other face it comprises the coded zone 3a consisting of a plurality of bars side by side arranged in accordance with a code of known type.

The identity card may be slide in one direction or the other at will, provided the coded zone is placed in the slot 2 facing the direction of the window 9.

When an identity card is slid into the slot 2, as soon as a part of the identity card 3 obscures the holes 7 and 8, the photodiode detecting the presence of the identity card 4 sets the reader for reading a single identity card 3.

As the identity card 3 continues to slide into the slot 2, the coded zone 3a will become disposed in front of the window 9 which is intensely illuminated by the lamp 5 by way of the condenser 6.

The light rays are fed to the identity card 3 at a certain inclination to the direction perpendicular to the identity card face. This means that identity cards with shiny, plasticised or otherwise reflecting surface may be used, without the reflected rays negatively influencing the exact reading of the coded zone, the rays which are reflected because of the inclination of the light rays being deviated upwards and normally absorbed by the inner face of the frame 1.

The rotating mirror 10, which rotates about a vertical axis at high speed, for example 3,000 r.p.m., reflects the points of an ideal straight line which longitudinally crosses the bar code on a photodiode 11 which emits a signal representing the serialised configuration on time of the bars impressed in the coded zone *3a*. The fact that the mirror 10 has four faces disposed at different angles to the axis of rotation firstly permits for readings to be made in one revolution, and also permits the coded zonded to be scanned at four different heights, so eliminating the effect of any local deterioration of the coded zone.

As previously stated, it is alternatively possible, by giving them suitable angles of inclination, to make one pair of faces of the mirror 10 read a coded zone in one part of the identity card and make the other pair of faces read another coded zone disposed at a different height on the card. It is therefore not necessary tha each face of the pyramidal mirror is differently inclined to the axis of the mirror, but some faces may have identical inclination. When each face has a different inclination there will be at each revolution of the pyramidal mirror a reading on a number of different lines corresponding to the number of lateral faces.

The faces need not necessarily be four in number, but may be of any number compatible with the geometry of the device. By the geometry of the device is meant the required angle which has to be formed between the ray arriving from the slot 9 and the ray fed to the photodiode 11.

The device also comprises an emitter of an optical signal, consisting of obscuring the luminous indicators of the visualiser 12, and an acoustic signal for warning the operator that the optical reading device is making a reading.

This signal is normally very short and enables a very rapid succession of people to use the reader.

From the description it can be seen that the optical reading device described attains all the proposed objects, and in particular is practical and functional, requiring only rough positioning of the identity card in the slot rather than exact positioning.

1. A device for optically reading coded identity cards and the like, comprising a slot into which an identity card can be inserted sideways, an element for detecting the presence of said identity card in said slot, a window in said slot arranged to face at least the coded zone of said identity card, a light source for illuminating said coded zone, a rotating mirror arranged to read said zone, a photodiode for collecting the images fed to it by said rotating mirror and to emit a signal which represents said images in a seriliazed configuration, and a unit for visualizing said signal, wherein said mirror is a pyramidal mirror having lateral faces arranged differently inclined to the axis of rotation of said pyramidal mirror so as to make readings of coded zones disposed at different levels on said identity card.

2. A device as claimed in claim 1, in which each lateral face of said pyramidal mirror is arranged differently inclined to the axis of rotation of said pyramidal mirror, so that at each revolution of the mirror the coded zone of said identity card is read on a number of lines situated a different levels corresponding to the number of lateral faces.

3. A device as claimed in claim 1, in which said light source is arranged to transmit light rays through said window on to said coded zone along a direction inclined to the perpendicular to the plane defined by said identity card.

* * * * *